United States Patent
Reddan et al.

(10) Patent No.: US 11,227,407 B2
(45) Date of Patent: Jan. 18, 2022

(54) SYSTEMS AND METHODS FOR AUGMENTED REALITY APPLICATIONS

(71) Applicant: EIDOS INTERACTIVE CORP., Montréal (CA)

(72) Inventors: Anthony Reddan, Montréal (CA); Renaud Bédard, Montréal (CA)

(73) Assignee: EIDOS INTERACTIVE CORP., Montréal (CA)

( * ) Notice: Subject to any disclaimer, the term of this patent is extended or adjusted under 35 U.S.C. 154(b) by 182 days.

(21) Appl. No.: 16/551,489

(22) Filed: Aug. 26, 2019

(65) Prior Publication Data

US 2020/0394819 A1    Dec. 17, 2020

(30) Foreign Application Priority Data

Jun. 11, 2019  (CA) .................... CA 3046003

(51) Int. Cl.
  *G06T 19/00* (2011.01)
  *G06T 7/73* (2017.01)
  *G01B 11/02* (2006.01)

(52) U.S. Cl.
  CPC .............. *G06T 7/75* (2017.01); *G01B 11/026* (2013.01); *G06T 19/006* (2013.01); *G06T 2207/10028* (2013.01); *G06T 2210/12* (2013.01)

(58) Field of Classification Search
  CPC .. G06T 7/70; G06T 7/75; G06T 7/593; G06T 7/521; G06T 2207/30244; G06T 19/006; G06T 2207/10028; G06T 2210/12; G01B 11/026; G06K 9/00671; H04N 2013/0081
  See application file for complete search history.

(56) References Cited

U.S. PATENT DOCUMENTS

| | | | | |
|---|---|---|---|---|
| 2011/0142354 A1* | 6/2011 | Sung | ................... | G06T 7/73 |
| | | | | 382/209 |
| 2011/0166696 A1* | 7/2011 | Nignon | ............... | B25J 11/0045 |
| | | | | 700/223 |
| 2017/0213110 A1* | 7/2017 | Zhu | ................... | G06K 9/4642 |
| 2018/0374235 A1* | 12/2018 | Kamata | ............ | G06K 9/00214 |
| 2019/0102601 A1* | 4/2019 | Karpas | ................... | G06F 30/23 |
| 2020/0012869 A1* | 1/2020 | Li | ................... | G06T 7/50 |
| 2020/0126249 A1* | 4/2020 | Tang | ................... | G06T 7/0002 |
| 2020/0376675 A1* | 12/2020 | Bai | ................... | G06T 7/73 |

OTHER PUBLICATIONS

Jan Zeman, "Understanding EXIF: What Metadata Is and How to Use It", Learn Photography by Zoner Photo Studios, Nov. 6, 2018, 10 pages total, printed from https://learn.zoner.com/understanding-exif-what-metadata-is-and-how-to-use-it/. (Year: 2018).*

* cited by examiner

*Primary Examiner* — Brian Werner
(74) *Attorney, Agent, or Firm* — Fenwick & West LLP (57) ABSTRACT

The disclosure relates to systems, methods and processor-readable storage mediums, having processor-executable instructions stored thereon, for determining the position of a real-world object in an augmented reality application running on a computing device having a camera. The method includes capturing image information using the camera. Detection of real-world objects is then performed using a computer vision model, and filtering of a received point cloud is performed by way of a virtual frustum constructed using the captured image information. Finally, the position of the object is determined using the filtered points.

31 Claims, 9 Drawing Sheets

SYSTEMS AND METHODS FOR AUGMENTED REALITY APPLICATIONS

CROSS-REFERENCE TO RELATED APPLICATION

This application claims priority to Canadian Patent Application No. 3,046,003 filed on Jun. 11, 2019, which is incorporated by reference herein in its entirety.

FIELD

The disclosure relates to the field of Augmented Reality applications. In particular, the disclosure relates to systems and methods for estimating the position and/or size of real-world objects in an Augmented Reality application.

BACKGROUND

Augmented Reality (AR) was develop as a series of technologies aimed at overlaying computer-generated virtual images onto a user's view of the real-world. The widespread use of Global Positioning System (GPS) chips, digital compasses and accelerometers in mobile devices such as smart phones has led to a growth in mobile AR applications. While such mobile devices typically have far less processing power than personal computers, their portability has been a catalyst for the proliferation of mobile AR applications.

As the sophistication of mobile technologies grows, many mobile AR applications provide functionality that goes beyond simply overlaying virtual elements onto real-world scenes, by incorporate real-time visual and auditory interaction between virtual and real-world objects. Accordingly, mobile AR applications increasingly require the seamless mixing of virtual and real-world elements.

Implementations of such interactivity include placing virtual visual and/or aural elements around a real-world object, e.g. positioning a virtual pen in a real world cup, as well as using the position of real-world objects as anchor points for interaction between the virtual world and the real world, e.g. using the position of an object as a waypoint for an intelligent agent (IA) to inspect and/or gather resources from.

Known image tracking systems have significant disadvantages. For example, because both image and object recognition systems require comparison of detected images or objects with pre-scanned images or objects, respectively, they cannot recognize images/objects for which the systems have no prior image/object scans. Moreover, these systems require that the image/object scans have similar characteristics (e.g. lighting conditions, size) to the views of the detected images/objects.

The increasing ubiquity of mixing virtual and real-world elements, coupled with the limited processing power and communication speeds of most mobile devices and the aforementioned deficiencies in known methods, has led to the need for improved systems and methods of estimating the position and/or size of real-world objects in an AR application.

SUMMARY

According to a first aspect, there is provided a method of determining the position of a real-world object in an augmented reality application running on a computing device having a camera. The method comprises the steps of capturing image information using the camera, the image information comprising an image of a real-world scene and detecting a real-world object in the image using a computer vision model configured to generate a bounding shape associated with the real-world object. The method also comprises the steps receiving a point cloud relating to the image and constructing a virtual frustum using the geometry of the bounding shape and the image information. The method also comprises the steps of identifying a group of points located within the frustum and calculating a representative distance of the group of points from the camera.

According to another aspect, there is provided a system for determining the position of a real-world object in an augmented reality application running on the system. The system comprises a camera configured to capture image information, the image information comprising an image of a real-world scene. The system also comprises a processing entity configured to detect a real-world object in the image using a computer vision model configured to generate a bounding shape associated with the real-world object. The processing entity is further configured to receive a point cloud relating to the image and construct a virtual frustum using the geometry of the bounding shape and the image information. The processing entity is further configured to identify a group of points located within the frustum and calculate a representative distance of the group of points from the camera.

According to yet another aspect, there is provided a processor-readable storage medium, having processor-executable instructions stored thereon, which, when executed by a processor, cause a computing device comprising the processor and a camera to implement an augmented reality application. The augmented reality application is configured to capture image information using the camera, the image information comprising an image of a real-world scene and detect a real-world object in the image using a computer vision model configured to generate a bounding shape associated with the real-world object. The augmented reality application is further configured to receive a point cloud relating to the image and construct a virtual frustum using the geometry of the bounding shape and the image information. The augmented reality application is further configured to identify a group of points located within the frustum and calculate a representative distance of the group of points from the camera.

These and other aspects and features of the present invention will now become apparent to those of ordinary skill in the art upon review of the following description of specific embodiments of the invention in conjunction with the accompanying drawings.

The accompanying drawings are intended to show example non-limiting embodiments and are not intended to be limitative.

DETAILED DESCRIPTION

Figure 1:
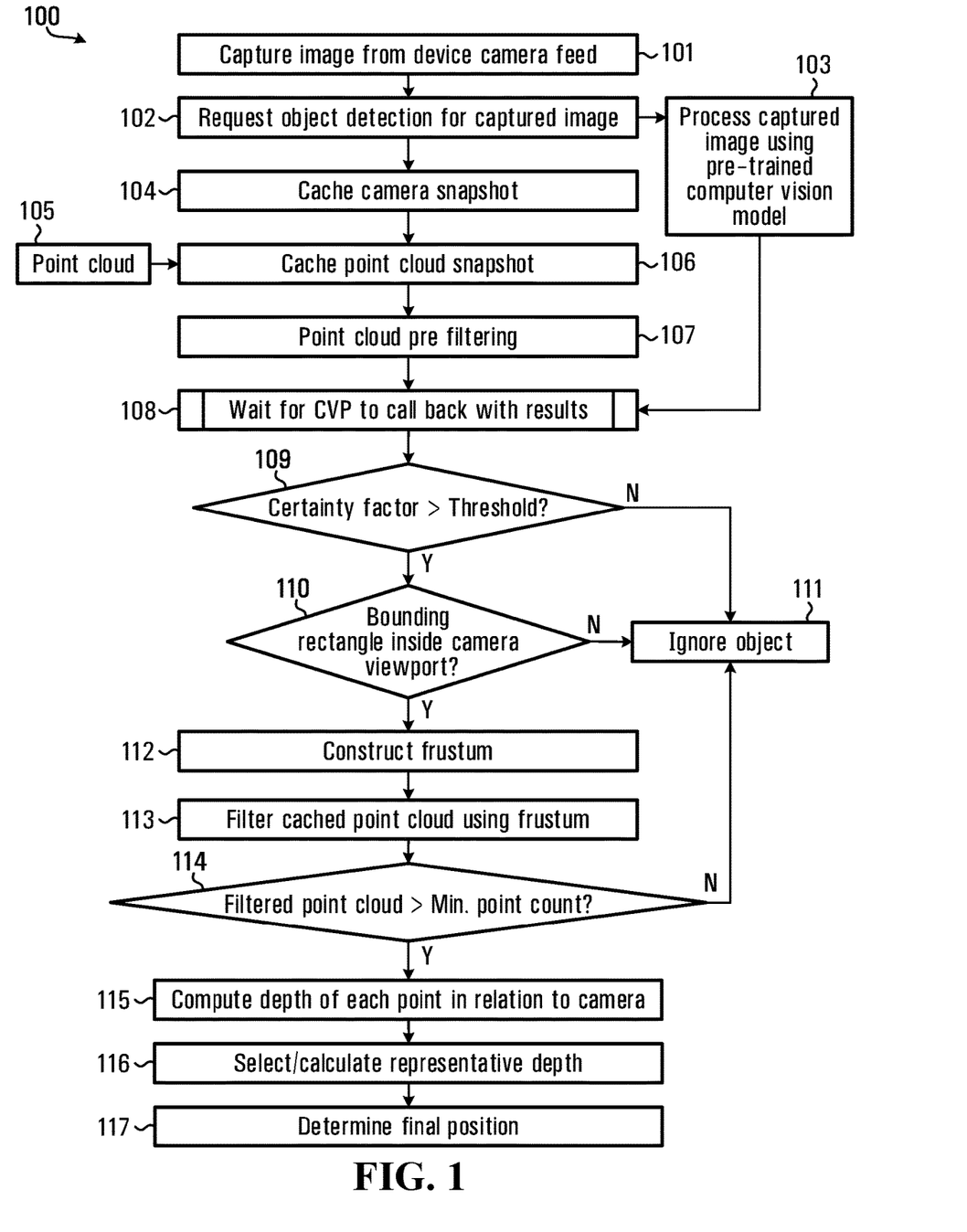
FIG. 1 is a flowchart illustrating steps in determining the position of a real-world object in a mobile AR application.

With reference to FIG. 1, in some embodiments, a method 100 of estimating the position of real-world objects in an AR application is provided.

Figure 10:
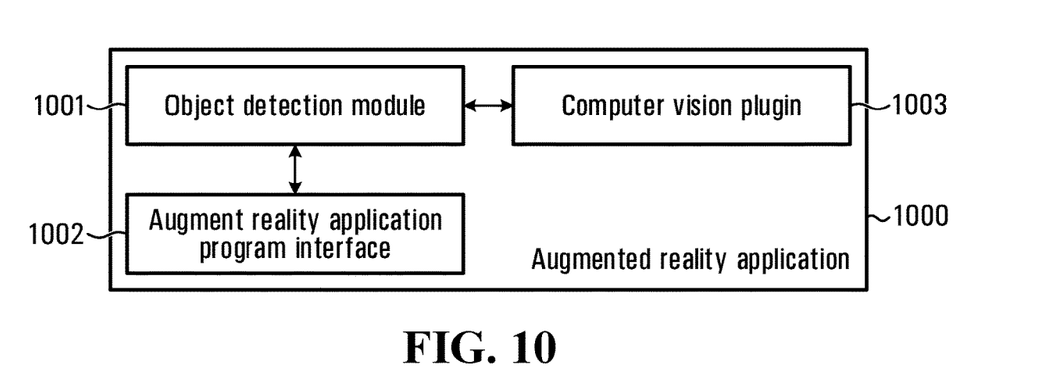
FIG. 10 is a block diagram of an AR application for implementing the methods of FIG. 1 and FIG. 8.

FIG. 10 shows a high-level block diagram of an example system suitable for implementing the method 100 of FIG. 1. The system comprises an AR application 1000 including an Object Detection Module (ODM) 1001, a Computer Vision Plugin (CVP) 1003 and an AR Application Program Interface (AR API) 1002. In some embodiments, the ODM 1001 is a software processing block that carries out, together with the CVP and the AR API, the method of FIG. 1.

The CVP can be any software component that adds computer vision functionality, such as computer vision machine learning, to the ODM and the AR API can be any software component that provides, or otherwise allows access to, augmented reality functionality, such as point cloud data, to the ODM. Examples of computer vision functionality includes that provided by TensorFlow™ Lite on Android™ operating systems and CoreML™ on iOS™ operating systems. Examples of augmented reality functionality includes that provided by ARCore™ on Android™ operating systems and ARKit™ on iOS™ operating systems.

In some embodiments, the AR application 1000 is run on a mobile device that is provided with a camera. After the AR Application 1000 is successfully initialized and the AR Session is reportedly tracking, at step 101, the ODM 1001 captures an image from the device camera feed (i.e. a video frame). Then, at step 102, when the AR API 1002 reports that the AR session is tracking (i.e. point cloud and other AR-related data is available), the ODM 1001 sends a request to the CVP 1003 to process the latest captured image using a pre-trained Computer Vision Model (CVM) at step 103.

Figure 2:
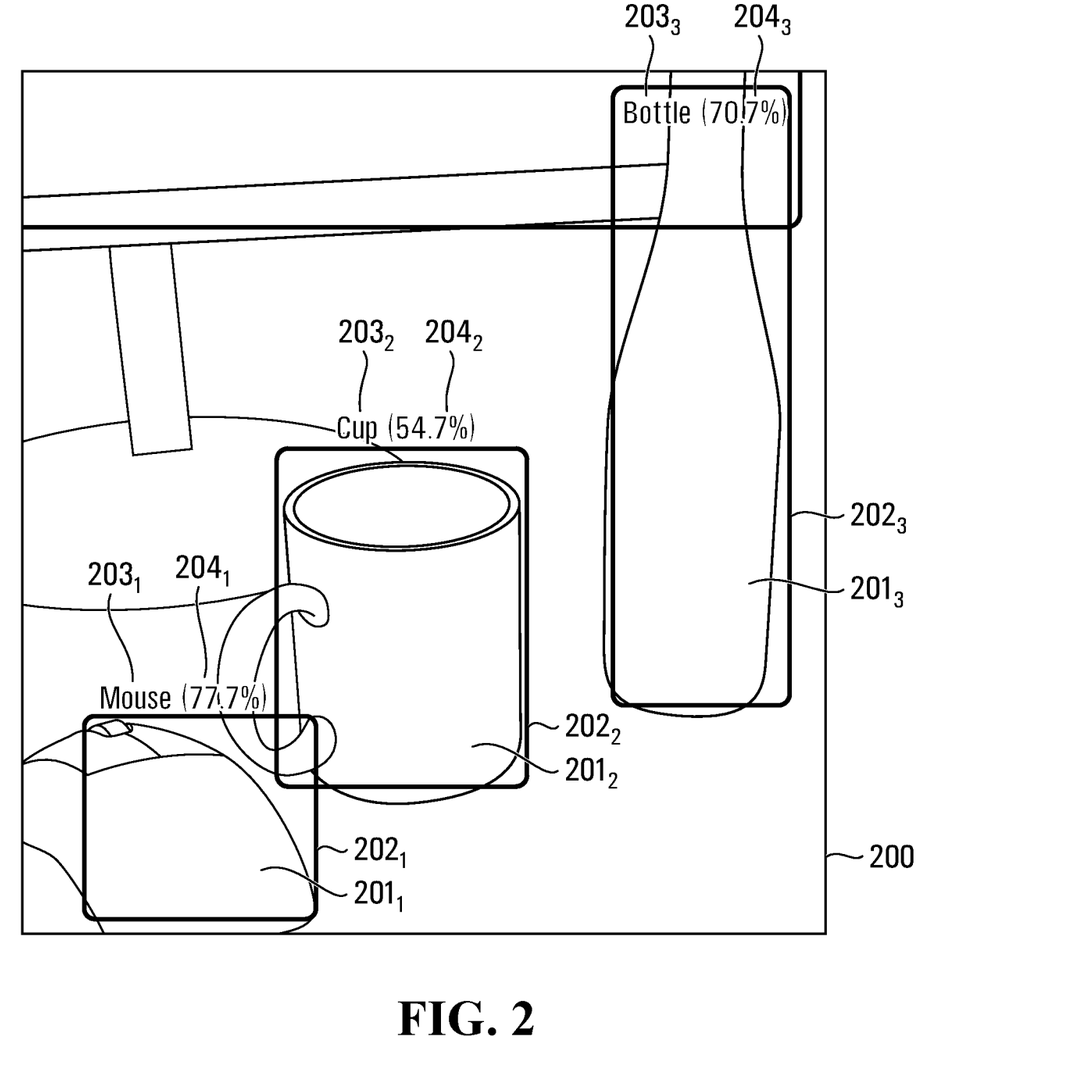
FIG. 2 is a diagram illustrating a number of data sets attributed to real-world objects by the output of computer vision.

In some embodiments, this is accomplished by having the CVM identify objects within the captured image. Processing the captured image with the CVM results in a list of detected objects $201_x$, each having an associated set of data. As shown in FIG. 2, in some embodiments, the set of data for each object includes a name label $203_x$ (e.g. mouse $203_1$, cup $203_2$, bottle $203_3$), a certainty factor $204_x$ (e.g. 0-100%) and a 2D bounding rectangle $202_x$ (in, for example, pixel coordinates relative to the frame that was provided to the model). The name label $203_x$ represents the model's determination of the type of object identified, based on, for example, shape, colour, texture and relative size. The certainty factor $204_x$ represents the level of certainty with which the model has determined the type of object. The 2D bounding rectangle $202_x$ (or other suitable bounding shape) represents an estimation of the physical boundary of each object. In some embodiments, further data can be included in the set of data for each object. Moreover, in other embodiments, other shapes can be used to bound objects $201_x$, such as bounding circles or bounding triangles. In still other embodiments, the bounding shape can generated which closely follow the silhouette of each object $201_x$ from the perspective of the camera (also known as object segmentation).

At step 104, the ODM 1001 caches a camera data snapshot including, in some embodiments, the position of the camera, the orientation of the camera, the aspect ratio, the viewport pixel dimensions (width/height), the field of view, the near clip plane and the far clip plane. As will be appreciated, step 104 can include caching any further information that could be useful in carrying out the steps described below.

At step 105, an AR point cloud is received from the AR API 1002, and an AR point cloud snapshot is cached by the ODM 1001 at step 106. As will be appreciated, the AR point cloud snapshot cached at step 106 is consistent with the camera snapshot cached at step 104 and the image captured from the device camera feed at step 101. An AR point cloud is a set of data points in 3D space that are continuously generated by the AR API 1002 based on the surface features of real-world objects. Once generated, AR point clouds can provide reference to anchor virtual features in real-world space.

In some embodiments, the method comprises one or more point cloud pre-filtering steps (step 107). In particular, in some embodiments, the point cloud confidence values provided by the AR API 1002 can be used to exclude points below a specified threshold. For example, if the confidence value of a point is below 60%, it is likely that the estimated depth of the point is not accurate enough for the purposes of the method of FIG. 1.

In some embodiments, pre-filtering is provided by filtering out points that are beyond a distance threshold from the camera (e.g. 5 m), as the further away a point is, the more likely it is to be inaccurate. As will be appreciated, distance-based pre-filtering is particularly relevant for near-field and/or indoor applications (i.e. for objects in reasonably close proximity).

In some embodiments, the ODM 1001 requires a minimum number of point cloud points to remain after pre-filtering for an object to be considered as having been detected. As will be appreciated, point cloud pre-filtering can improve the accuracy of the method of FIG. 1. At step 108, the ODM 1001 waits for the CVP 1003 to callback with the CVM results. As described above, the CVM results include a list of detected objects, each having an associated set of data.

For each object identified by the CVP 1003, one or more of steps 109 to 114 are carried out. In some embodiments, a determination is made at step 109 as to whether or not the certainty factor $204_x$ attributed to a given object $201_x$ is above a predetermined threshold value (e.g. 65%). If the certainty factor $204_x$ of a given object $201_x$ is below the predetermined threshold value, the object is ignored at step 111 and the method is ended with respect to that object. If, however, a determination is made at step 109 that the certainty factor $204_x$ of a given object is not below the predetermined threshold, in some embodiments, a determination is made as to whether the 2D bounding rectangle 202x is inside the AR application viewport, as described below.

The field of view used by the AR application (i.e. the AR application camera viewport) may be less than the maximum field of view of the camera of the mobile device. As a result, the video feed of the AR application may contain less information than the video feed produced by the camera of the mobile device. In such a scenario, the AR application still captures the full size video feed hat the mobile device can provide and uses it as an input to the CVM. When the results are returned, a determination can then be made as to whether or not any detected object fits within the AR application camera viewport. In some embodiments, the determination is made in relation to a tolerance of how far outside the camera viewport an object can be located. Thus, in order to avoid partial detections of objects (for example, a CVM detecting a keyboard when only the number pad is in view), the method can optionally ensure that the 2D bounding rectangle 202$_x$ is inside the AR application camera viewport before continuing to step 112. If the 2D bounding rectangle 202$_x$ is not inside the AR application camera viewport, the object is ignored at step 111 and the method is ended with respect to that object.

Accordingly, if the certainty factor 204$_x$ attributed to a given object 201$_x$ is not below a predetermined threshold value and the 2D bounding rectangle 202x of the object 201x is inside the AR application camera viewport, then the method proceeds to step 112.

Figure 3:
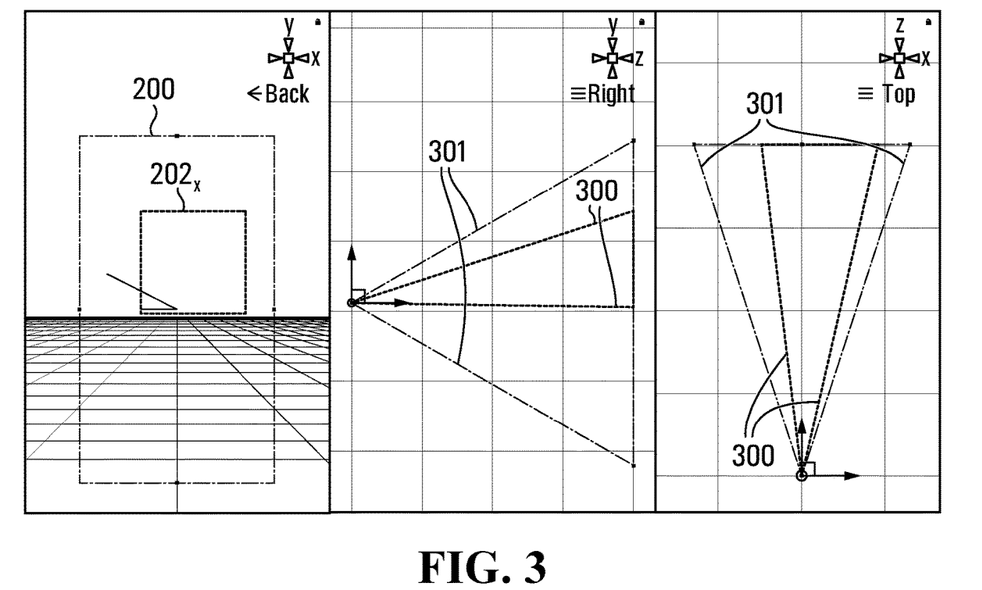
FIG. 3 is a diagram illustrating three perspective views of the construction of a 3D frustum from the 2D bounding rectangle of one of the objects selected from the objects of FIG. 2.

At step 112, a frustum 300 of four planes (e.g. top, bottom, left and right) is constructed by projecting the four sides of the bounding rectangle 202x of the given object from screen space into virtual space using the screen dimensions, transform data and field of view data from the memory snapshot of the camera frame data, as shown in FIG. 3. As will be appreciated, different bounding shapes (e.g. triangles or circles) will result in frustums having corresponding geometries. In some embodiments, this step can be computing the screen space position of all the point cloud points and determining if those lie inside the bounding rectangle. As will be appreciated, the this is computationally more expensive, as some points will be completely unused.

FIG. 3 illustrates the construction of a 3D frustum 300 from a 2D bounding rectangle 202$_x$, in which the outer outline indicates the camera frustum 301 of the camera frame 200, while the inner outline 300 indicates the frustum constructed from the bounding rectangle 202$_x$. In particular, a virtual frustum of four planes (top, bottom, left, right) is constructed by projecting the four sides of the 2D bounding rectangle 202$_x$ from screen space into world space using the screen dimensions, transform, and field of view from the camera data snapshot described above. Pictured on the left of FIG. 3 is camera frame 200 and the bounding rectangle 202$_x$ of an object 201$_x$. The other two views of FIG. 3 are the right and top views, respectively. As will be appreciated from the Figures and the present description, the term "frustum", as defined herein, represents a portion of the viewing frustum, or pyramid of vision, and does not require near plane or far plane truncation. Moreover, in embodiments where near plane truncation and/or far plane truncation is performed, such truncation planes can be positioned at any suitable distance.

Figure 4:
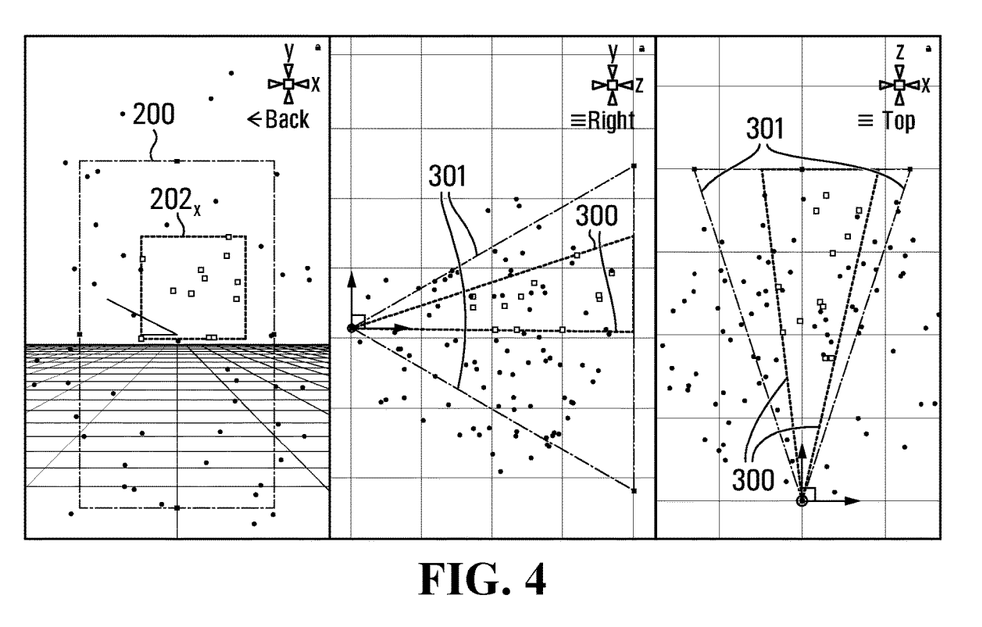
FIG. 4 is a diagram illustrating three perspective views of the filtered points of the cached AR point cloud of the selected object, which filtered points are positioned within the frustum of FIG. 3.

As shown in FIG. 4, at step 113, the AR point cloud cached at step 106 is filtered by the frustum 300 created at step 112 such that the set of points that lies within the frustum 300 is obtained. In other words, all points lying outside the frustum 300 are filtered out. This effectively provides all points contained within the initial bounding rectangle 202$_x$ from the perspective of the camera. In FIG. 4, points graphically represented by a square are located within the frustum 300, whereas points graphically represented by a circle are located outside of the frustum 300.

In some embodiments, a determination can also be made at step 114 as to whether or not the filtered point count (i.e. the number of points left after the original or pre-filtered point cloud is filtered by the frustum at step 113) is above a minimum point count. If the filtered point count is not above the minimum point count, the object is ignored at step 111 and the method is ended with respect to that object.

Figure 5:
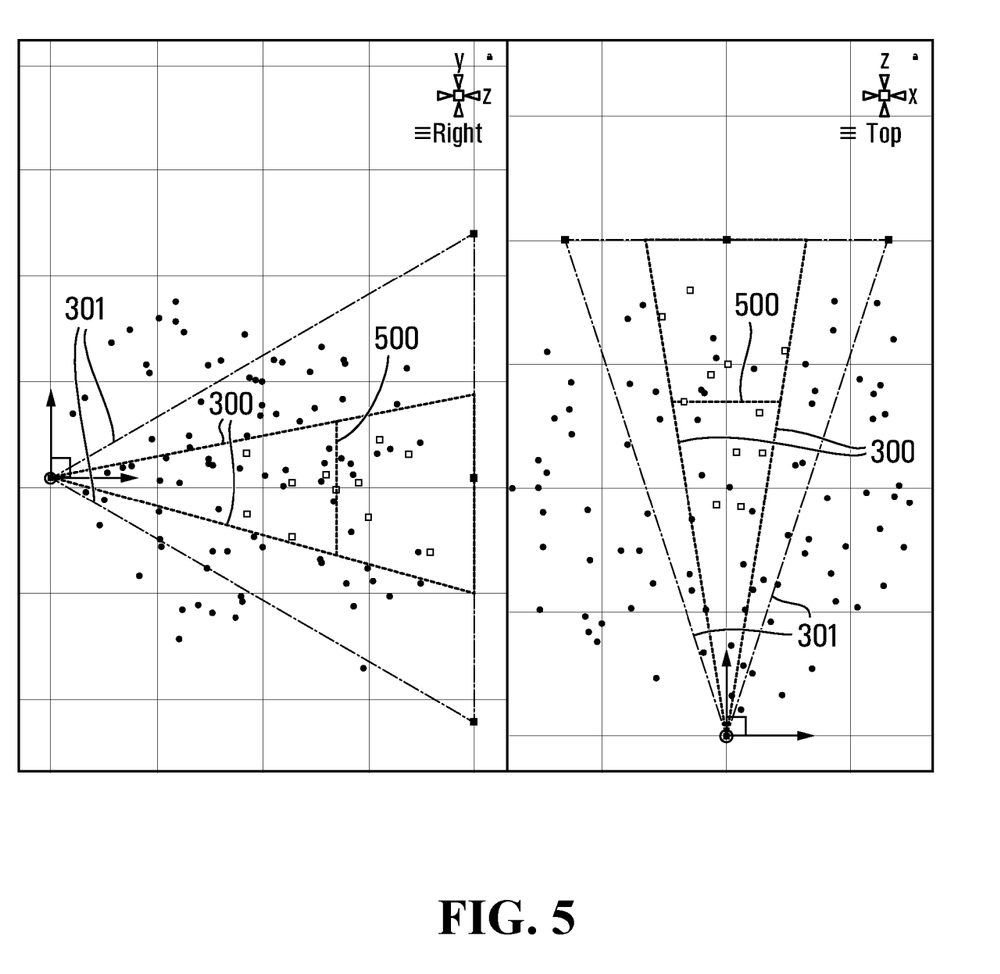
FIG. 5 is a diagram illustrating two perspective views of a determined representative depth plane of the filtered points of FIG. 4.

In some embodiments, at steps 115 to 117, the position of the object is computed using the filtered AR point cloud data. First, at step 115, the ODM 1001 computes the depth of each filtered point (i.e. each remaining point within frustum 300) in relation to the camera. Then, as shown in FIG. 5, at step 116, a representative depth 500 can be calculated or selected for the object. Examples of determining the representative depth include, but are not limited to, determining the geometric median of the filtered points, determining the centroid of the filtered points, determining the average depth of the filtered points in relation to the camera and determining the median depth of the filtered points in relation to the camera.

Advantageously, in order to avoid the computational burden associated with determining the geometric centre of the filtered points, and to avoid the sensitivity to outlying points associated with determining the centroid of the filtered points or calculating the average depth of the filtered points, a simpler method such as determining the median depth of the filtered points in relation to the camera is used. For example, FIG. 5 shows the calculation of a representative depth plane 500 by determination of the median depth of the filtered points in relation to the camera.

Figure 6:
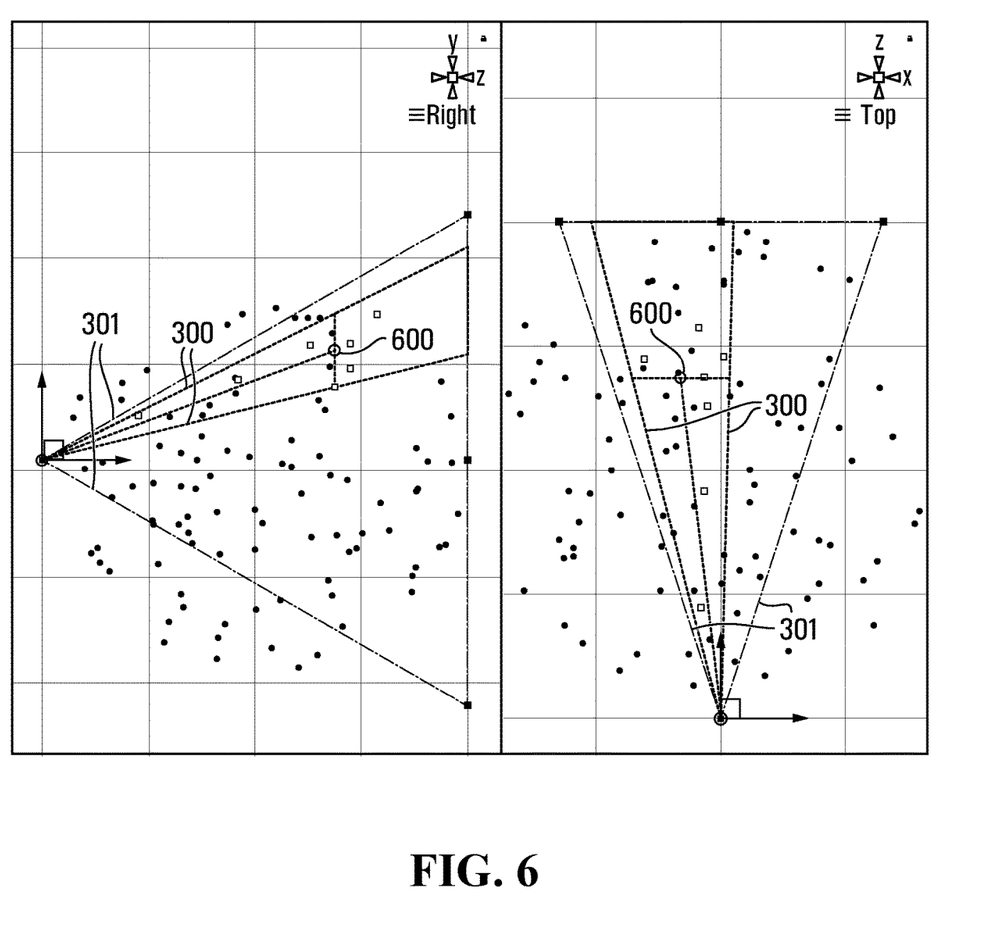
FIG. 6 is a diagram illustrating two perspective views of the final estimated 3D position of the selected object determined projecting the center point of the object's bounding rectangle onto the representative depth plane of FIG. 4.

Finally, at step 117, and as shown in FIG. 6, the center point of the bounding rectangle 202x is projected to the selected depth plane 500 in order to get the final estimated 3D position 600 for the object 201x. As will be appreciated, AR APIs include the concept of an AR Anchor which is used for describing static real or virtual positions and orientations. This concept is required to keep a point from drifting as an AR world is developed. In some embodiments, the determined position 600 of the object 201x is converted into an AR Anchor associated with the object 201x in order to ensure that it remains static.

Figure 7:
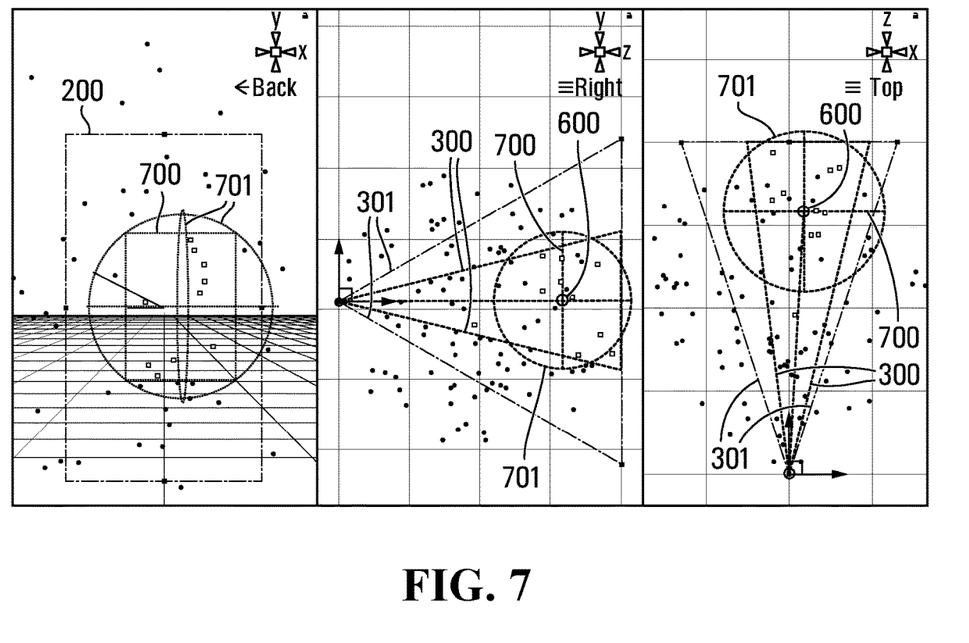
FIG. 7 is a diagram illustrating three perspective views of the estimation of a bounding volume by creating a bounding sphere having a radius large enough to incorporate the extents of the projected bounding rectangle of FIG. 6.

In some embodiments, once the position of the object is estimated in accordance with the above method, the method further comprises estimating the size (or bounding volume) of the object 201$_x$. In some embodiments, and as shown in FIG. 7, the bounding volume is estimated by taking the bounding rectangle 202$_x$ projected to the determined position 600 and creating a bounding sphere 701 having a radius large enough to incorporate the extents of the projected bounding rectangle 700.

In a preferred embodiment, the bounding volume is estimated by taking the bounding rectangle 202$_x$ projected to the determined position 600 and creating a bounding sphere 701 having a radius large enough to incorporate the dimension of the rectangle with the largest value (i.e. width or height, whichever value is larger). In some examples, the points may be further filtered by the bounding sphere to remove extreme outliers, with a view to increasing the accuracy of the bounding box. Advantageously, the bounding box includes the four corner points of the projected frustum at the determined position, along with the other filtered points.

Figure 8:
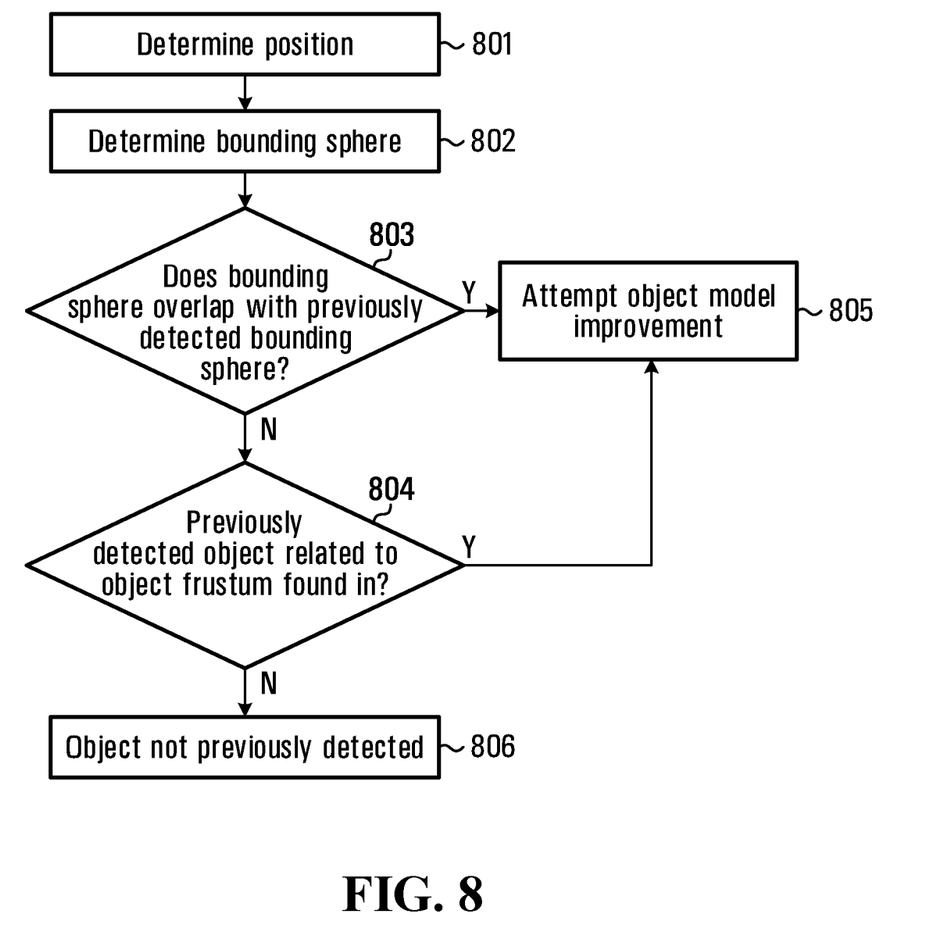
FIG. 8 is a flowchart illustrating steps in determining whether an object is considered to be previously detected.
Figure 9:
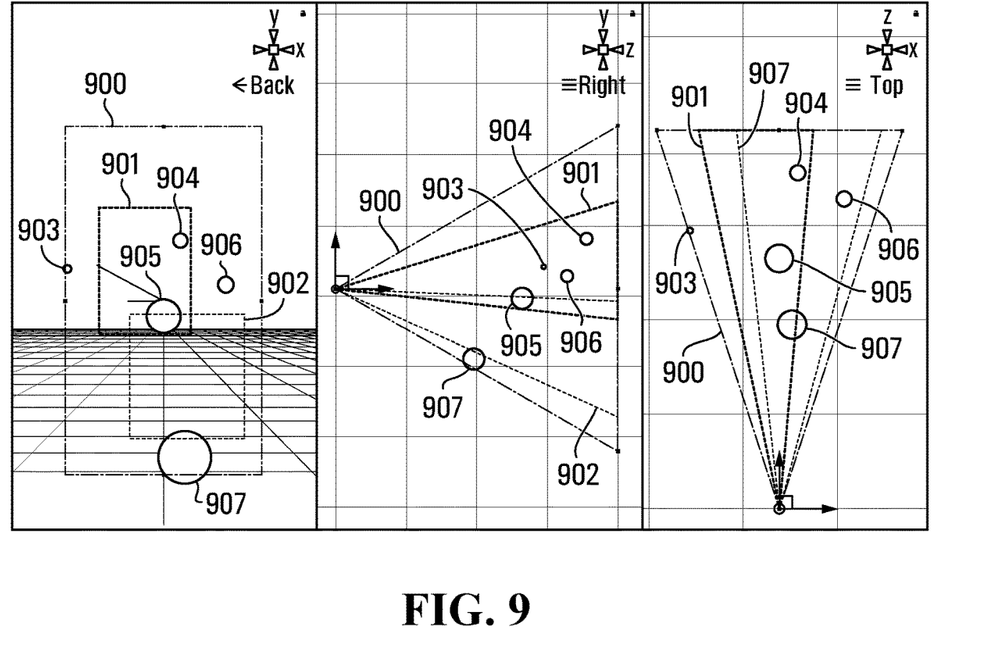
FIG. 9 is a diagram illustrating three perspective views of an application of the method of FIG. 8 to example objects.

In some embodiments, and with reference to FIGS. 8 and 9, the method may further include steps directed to processing previously detected objects. Processing previously detected objects avoids re-detection (i.e. detecting an already detected object as a new object), and allows for improving object model accuracy in terms of position and/or bounds. Accordingly, the method of FIG. 8 comprises further steps to process previously detected objects, with a view to determining whether a newly detected object has been previously detected and, optionally, whether to attempt to improve the previously created object model.

As shown in FIG. 8, the method of FIG. 1 can be carried out at step 801. Then, at step 802, a bounding sphere can be determined as described above with respect to a bounding sphere having a radius large enough to incorporate the dimension of the projected bounding rectangle 700 with the largest value. At step 803, a determination is made as to whether the bounding sphere overlaps with any previously detected bounding spheres. If the bounding sphere does overlap with any previously detected bounding spheres, then the object is found to be previously detected and the method continues at step 805, as described below.

If however, a determination is made that the bounding sphere does not overlap with any previously detected bounding spheres, then, at step 804, a determination is made as to whether the bounding volumes of any previously detected objects are related to the object associated with the frustum constructed during step 801. In some examples, a previously detected object $201_x$ having a certain label $203_x$ is related to a frustum constructed during step 801 if the object intersects or is contained within the frustum, and the object associated with the frustum has the same label $203_x$ (i.e. both the previously detected object and the computer vision model provided by the method have the same label $203_x$). If these conditions are met, the object is considered to be previously detected and the method continues at step 805, as described below. If, however, previously detected objects are determined not to be related to the frustum constructed during step 801, then the object is not considered to be previously detected. As will be appreciated, in some embodiments, step 804 can be carried out before step 803.

Several examples are shown in FIG. 9, in which a number of previously detected objects 903, 904, 905, 906 and 907 and two frustums 901 and 902 are shown. Previously detected objects 903 and 906 do not intersect and are not contained within either frustum 901 or frustum 902. Previously-detected objects 904 and 905 are completely contained in frustum 901 and previously detected objects 905 and 907 intersect frustum 902. Accordingly, if previously detected object 904 has the same label $203_x$ as the computer vision model associated with frustum 901, the previously detected object 904 will be considered to be related to frustum 901. Similarly, if previously detected object 907 has the same label $203_x$ as the computer vision model associated with frustum 902, the previously detected object 907 will be considered to be related to frustum 902. If previously detected object 905 has the same label $203_x$ as the computer vision model associated with frustum 901, the previously detected object 905 will be considered to be related to frustum 901. If however the previously detected object 905 has the same label $203_x$ as the computer vision model associated with frustum 902, the previously detected object 905 will be considered to be related to frustum 902.

If an object is found to be previously detected at either step 803 or step 804, it is then possible to use any newly filtered data (points and bounding rectangle) to adjust the position and expand/contract the bounding volume of the object. Accordingly, in some embodiments, the method of FIG. 8 further comprises step 805, in which an attempt is made to improve the object model. In some embodiments, step 805 comprises including newly detected points and/or excluding previously-detected points that lie outside the bounding frustum when viewed from a different angle. In some examples, exclusion of previously-detected points can be achieved using point IDs which some AR APIs provide.

The description and drawings merely illustrate the principles of the invention. It will thus be appreciated that those skilled in the art will be able to devise various arrangements that, although not explicitly described or shown herein, embody the principles of the invention and are included within its scope, as defined in the appended claims.

Furthermore, all examples recited herein are principally intended to aid the reader in understanding the principles of the invention and are to be construed as being without limitation to such specifically recited examples and conditions. For example, the present disclosure describes embodiments of the invention with reference to the analysis of various desktop objects. It will however be appreciated by the skilled reader that the present invention can also advantageously be used to search other types and forms of objects in other environments.

Moreover, all statements herein reciting principles, aspects, and embodiments of the invention, as well as specific examples thereof, are intended to encompass equivalents thereof. For example, the functions of the various elements shown in the figures, including any functional blocks labelled as "module", "plugin" or "application program interface" may be provided through the use of dedicated hardware as well as hardware capable of executing software in association with appropriate software.

Furthermore, while the aforementioned description refers to mobile devices, a person of skill in the art would readily recognize that steps of various above-described methods can be performed by any number of computing devices, such as video cameras, digital cameras, infrared cameras, desktop computers, laptop computers, tablets, smartphones, smart watches or other wearables. Herein, some embodiments are also intended to cover program storage devices, e.g., digital data storage media, which are, machine or computer readable and encode machine-executable or computer-executable programs of instructions, wherein said instructions perform some or all of the steps of the above-described methods. The embodiments are also intended to cover computers programmed to perform said steps of the above-described methods.

Any feature of any embodiment discussed herein may be combined with any feature of any other embodiment discussed herein in some examples of implementation. Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

The invention claimed is:

1. A method of determining an estimated 3D position of a real-world object in an augmented reality application running on a computing device having a camera, the method comprising the steps of:
    capturing image information using the camera, the image information comprising an image of a real-world scene;
    detecting a real-world object in the image using a computer vision model configured to generate a bounding shape associated with the real-world object;

receiving a point cloud relating to the image;
constructing a virtual frustum using the geometry of the bounding shape and the image information;
identifying a group of points located within the frustum;
calculating a representative distance of the group of points from the camera; and
projecting the center point of the bounding shape to the representative distance to determine the estimated 3D position of the object.

2. The method of claim 1, wherein the image data comprises one or more of the position of the camera, the orientation of the camera, the aspect ratio, the viewport pixel dimensions, the field of view, the near clip plane and the far clip plane.

3. The method of claim 1, wherein the bounding shape comprises a rectangle.

4. The method of claim 1, wherein the computing device comprises a smartphone.

5. The method of claim 1, wherein the computer vision model is further configured to determine an object name label identifying the type of object.

6. The method of claim 5, wherein the computer vision model is further configured to determine a certainty factor relating to a calculated degree of certainty associated with the object name label.

7. The method of claim 6, wherein the method further comprises the step of:
determining that an object is not detected if the calculated degree of certainty is below a predetermined threshold.

8. The method of claim 1, wherein the method further comprises the step of pre-filtering the received point cloud prior to the identifying step.

9. The method of claim 8, wherein the pre-filtering step is performed based on the distance of each point from the camera.

10. The method of claim 8, wherein the step of receiving a point cloud relating to the image further comprises the step of receiving a certainty value for each point of the point cloud, and the pre-filtering step is performed based on the certainty values of the points.

11. The method of claim 2, wherein the image data comprises screen dimensions, transform data and field of view, and the step of constructing a virtual frustum using the geometry of the bounding shape and the image information further comprises the step of projecting the sides of the bounding shape from screen space into virtual space using the screen dimensions, transform data and field of view.

12. The method of claim 1, wherein the step of calculating a representative distance of the group of points from the camera further comprises the step of determining the median distance of the group of points from the camera.

13. The method of claim 1, wherein the step of calculating a representative distance of the group of points from the camera further comprises the step of determining the average distance of the group of points from the camera.

14. The method of claim 1, wherein the method further comprises the step of estimating a bounding volume of the object.

15. The method of claim 14, wherein the step of estimating the bounding volume of the object further comprises the step of:
projecting the bounding shape to the calculated distance and creating a bounding volume large enough to incorporate the extents of the projected bounding shape.

16. A system for determining an estimated 3D position of a real-world object in an augmented reality application running on the system, the system comprising:
a camera configured to capture image information, the image information comprising an image of a real-world scene; and
a processor configured to:
detect a real-world object in the image using a computer vision model configured to generate a bounding shape associated with the real-world object;
receive a point cloud relating to the image;
construct a virtual frustum using the geometry of the bounding shape and the image information;
identify a group of points located within the frustum;
calculate a representative distance of the group of points from the camera; and
project the center point of the bounding shape to the representative distance to determine the estimated 3D position of the object.

17. A non-transitory processor-readable storage medium, having processor-executable instructions stored thereon, which, when executed by a processor, cause a computing device comprising the processor and a camera to implement an augmented reality application configured to:
capture image information using the camera, the image information comprising an image of a real-world scene;
detect a real-world object in the image using a computer vision model configured to generate a bounding shape associated with the real-world object;
receive a point cloud relating to the image;
construct a virtual frustum using the geometry of the bounding shape and the image information;
identify a group of points located within the frustum;
calculate a representative distance of the group of points from the camera; and
project the center point of the bounding shape to the representative distance to determine the estimated 3D position of the object.

18. The non-transitory processor-readable storage medium of claim 17, wherein the image data comprises one or more of the position of the camera, the orientation of the camera, the aspect ratio, the viewport pixel dimensions, the field of view, the near clip plane and the far clip plane.

19. The non-transitory processor-readable storage medium of claim 17, wherein the bounding shape comprises a rectangle.

20. The non-transitory processor-readable storage medium of claim 17, wherein the computing device comprises a smartphone.

21. The non-transitory processor-readable storage medium of claim 17, wherein the computer vision model is further configured to determine an object name label identifying the type of object.

22. The non-transitory processor-readable storage medium claim 21, wherein the computer vision model is further configured to determine a certainty factor relating to a calculated degree of certainty associated with the object name label.

23. The non-transitory processor-readable storage medium of claim 22, wherein the augmented reality application is further configured to:
determine that an object is not detected if the calculated degree of certainty is below a predetermined threshold.

24. The non-transitory processor-readable storage medium of claim 22, wherein the augmented reality application is further configured to pre-filter the received point cloud prior to the identifying step.

25. The non-transitory processor-readable storage medium of claim 24, wherein pre-filtering is performed based on the distance of each point from the camera.

26. The non-transitory processor-readable storage medium of claim 24, wherein the augmented reality application is further configured to receive a certainty value for each point of the point cloud to pre-filter based on the received certainty values of the points.

27. The non-transitory processor-readable storage medium of claim 18, wherein the image data comprises screen dimensions, transform data and field of view, and the augmented reality application is further configured to construct a virtual frustum using the geometry of the bounding shape and the image information by projecting the sides of the bounding shape from screen space into virtual space using the screen dimensions, transform data and field of view.

28. The non-transitory processor-readable storage medium of claim 17, wherein the augmented reality application is further configured to calculate a representative distance of the group of points from the camera by determining the median distance of the group of points from the camera.

29. The non-transitory processor-readable storage medium of claim 17, wherein the augmented reality application is further configured to calculate a representative distance of the group of points from the camera by determining the average distance of the group of points from the camera.

30. The non-transitory processor-readable storage medium of claim 17, wherein the augmented reality application is further configured to estimate a bounding volume of the object.

31. The non-transitory processor-readable storage medium of claim 30, wherein the augmented reality application is further configured to estimate a bounding volume of the object by projecting the bounding shape to the calculated distance and creating a bounding volume large enough to incorporate the extents of the projected bounding shape.

* * * * *